United States Patent [19]
McAuliffe et al.

[11] Patent Number: 5,870,705
[45] Date of Patent: Feb. 9, 1999

[54] METHOD OF SETTING INPUT LEVELS IN A VOICE RECOGNITION SYSTEM

[75] Inventors: Garrett McAuliffe, Kirkland; Leonard Zuvela, Mikilteo, both of Wash.

[73] Assignee: Microsoft Corporation, Redmond, Wash.

[21] Appl. No.: 327,543

[22] Filed: Oct. 21, 1994

[51] Int. Cl.⁶ ..................................................... G10L 9/00
[52] U.S. Cl. .......................... 704/225; 704/275; 704/200; 381/106; 381/107; 381/108
[58] Field of Search ................... 395/2.34, 2.84, 395/2; 381/68.4, 28, 107, 106, 108

[56] References Cited

U.S. PATENT DOCUMENTS

| | | |
|---|---|---|
| 4,250,637 | 2/1981 | Scott . |
| 4,292,469 | 9/1981 | Scott et al. . |
| 4,297,527 | 10/1981 | Pate ......................................... 381/107 |
| 4,354,064 | 10/1982 | Scott . |
| 4,383,135 | 5/1983 | Scott et al. . |
| 4,455,676 | 6/1984 | Kaneda ..................... 381/106 |
| 4,468,204 | 8/1984 | Scott et al. . |
| 4,495,384 | 1/1985 | Scott et al. . |
| 4,610,023 | 9/1986 | Noso et al. ............................. 395/2.84 |
| 4,672,667 | 6/1987 | Scott et al. . |
| 4,776,016 | 10/1988 | Hansen ................................... 395/2.84 |
| 4,777,649 | 10/1988 | Carlson et al. ........................... 381/26 |
| 4,783,803 | 11/1988 | Baker et al. . |
| 4,829,576 | 5/1989 | Porter . |
| 4,829,578 | 5/1989 | Roberts . |
| 4,837,831 | 6/1989 | Gillick et al. . |
| 4,866,778 | 9/1989 | Baker . |
| 4,903,302 | 2/1990 | Graciotti et al. ......................... 381/31 |
| 4,903,305 | 2/1990 | Gillick et al. . |
| 4,914,703 | 4/1990 | Gillick . |
| 4,969,193 | 11/1990 | Scott et al. . |
| 5,025,471 | 6/1991 | Scott et al. . |
| 5,027,406 | 6/1991 | Roberts et al. . |
| 5,208,866 | 5/1993 | Kato et al. ............................... 381/107 |
| 5,267,322 | 11/1993 | Smith et al. ............................ 381/107 |
| 5,345,538 | 9/1994 | Narayannan et al. ................. 395/2.84 |
| 5,363,147 | 11/1994 | Joseph et al. ........................... 381/108 |

Primary Examiner—David R. Hudspeth
Assistant Examiner—Vijay B. Chawan
Attorney, Agent, or Firm—Ratner & Prestia

[57] ABSTRACT

A computer implemented voice recognition method and system for adjusting an input level to adjust the input signal amplitude level of spoken words to enhance voice recognition. A user is prompted with a word to speak into a microphone. The spoken word is converted into an analog electrical signal having an input signal amplitude level. A sound card then converts this analog signal to a digital stream of data. This input signal amplitude level is compared to a reference amplitude level. An adjustment to an input volume control is made with respect to the comparison to adjust the input signal amplitude level to approach the reference amplitude level. The invention also uses an iterative process for a set number of iterations to make the adjustment for the input signal amplitude level to approach the reference amplitude level.

28 Claims, 4 Drawing Sheets

METHOD OF SETTING INPUT LEVELS IN A VOICE RECOGNITION SYSTEM

FIELD OF THE INVENTION

This invention relates to a method and system for adjusting audio input volume for a system which uses voice recognition.

BACKGROUND OF THE INVENTION

Voice recognition is the process by which spoken words are interpreted and "understood" by a computer. Voice recognition systems thus become another means for entering data and controlling a computer, to the function of a keyboard or a pointing device (e.g., mouse).

In a typical voice recognition system, a user speaks into an input device such as a microphone, which converts the audible sound waves of voice into an analog electrical signal. This analog electrical signal has a characteristic waveform defined by several factors including the volume at which the words are spoken. The volume component of the spoken word translates into the amplitude of the waveform.

Voice recognition involves pattern matching to compare the electrical signal associated with a spoken word against a reference signal associated with a "known" word. A "known" word is stored in a computer by a user. In a typical system, the user speaks a word into a microphone and the electrical signal of this spoken word is associated with a typed word. Instead of a typed word, the word can also be called up from a database, for example. After a word is "known," voice recognition can take place.

Thus, if the electrical signal of a spoken word matches the waveform of the reference signal of the "known" word, within an acceptable range of error, the system "recognizes" the spoken word as the "known" word (which has previously been associated with the reference signal). A software application which uses voice recognition could then use the voice input for entering data or controlling a software application (similar to the way a keyboard would be used). For example, in a word processor or dictation system using voice recognition text could be audibly entered into the body of a document via a microphone instead of typing the words into the text on a keyboard.

Digital signal processing can be used to provide an accurate comparison between the waveform of the voice audio input and that of the reference signal. Digital signal processing requires that the waveform of the voice audio input, as well as the waveform of the reference signal are represented as digital signals. Having a sufficient amplitude level for the voice audio input provides a better signal for conversion to a digital signal and thus a better reference signal for voice recognition. If the amplitude level is too low, there may not be enough range in the electrical signal of either the reference signal or the spoken word to provide a high enough level of confidence that the electrical signal of a spoken word matches that of the "known" word. If the amplitude level is too high, certain attributes of the electrical signals may be "clipped." This, too, may lower the confidence level of the pattern matching. In more extreme cases, the electrical signals may be too low or too high, resulting in no match. The sufficiency of the amplitude level is determined for a particular voice recognition "engine". The voice recognition engine is software or hardware which carries out the interpretation and analysis of the voice audio input (or its digital representative) to determine whether a match has occurred and the confidence level of the match. The Dragon Recognizer by Dragon Systems, Inc. of Newton, Mass. is an example of a voice recognition engine, which can be run on a personal computer.

Because different users speak at different sound levels, as well as the difference in background sound levels, both of which can effect the reception of a users speech by a voice recognition system, it is likely that in many situations, a voice recognition engine or system may not function at an optimal level. The audio input may not be within the acceptable range for the voice recognition engine being used.

Computers equipped for voice recognition may typically have a sound card in addition to an input device such as a microphone. A sound card typically includes a coder/decoder or CODEC. The Microsoft Sound System Sound Card uses the Analog Devices AD1848 Parallel-Port Sound-Port Stereo CODEC. Among other functions, the CODEC contains an input volume control which can be used to adjust the amplitude level of an analog input signal from the microphone. The CODEC also converts an analog signal (representative of a voice input) into a digital signal. The digital signal can then be transmitted from the sound card through the computer bus for processing (such as pattern matching) by the computer.

One widely sold operating system program which helps control a computer is WINDOWS™ version 3.1 ("WINDOWS") of Microsoft Corporation. Among other features, WINDOWS provides a graphical user interface allowing the user the option of using a pointing device such as a mouse, to control the operation of the computer without the need to memorize text commands usually required in DOS based applications. WINDOWS also provides application programmers with tools so that applications have a common look in structure as well as execution of common operations. A WINDOWS application programmer is thus provided with a variety of tools to assist in controlling various computer functions as well as designing "user friendly" applications.

A software program written for WINDOWS operation uses dynamic link libraries (DLLs) which contain a plurality of application programming interfaces (APIs). Examples of such DLLs are USER.EXE, KRNL386.EXE, and GDI.EXE which contain the core functionality APIs that make up Microsoft Windows 3.1. Although each of these three DLLs has the .EXE extension (usually representing an executable application), each is a DLL. The APIs are used to carry out various WINDOWS functions. For example, if a software program requires a dialog box displayed on a computer monitor to prompt a user for a command or data entry, the software program would make a call to the DialogBox API which brings up a dialog box on the computer monitor. The contents of the dialog box are local to or associated with the particular application which made the call. Another example of a WINDOWS API is the SetWindowLong API. This API associates data with a particular window, allowing a user who has switched applications to return to the point in the original application where processing had been taking place prior to the switch to the other application. WINDOWS operation and WINDOWS programming, including the use of DLLs and APIs are well known by those skilled in the art. The Microsoft WINDOWS Software Development Kit, Guide to Programming, Volumes 1–3, 1992, is incorporated by reference herein. It is available and used by WINDOWS programmers and provides reference information for many of the DLLs and APIs which are available to WINDOWS programmers.

WINDOWS, while providing ease of use for running applications, may serve as a platform for a voice recognition system. WINDOWS lacks, however, a system for adjusting input levels to optimize voice recognition for a particular user at given location.

A speech detection recognition apparatus for use with background noise of varying levels is described in U.S. Pat. No. 4,829,578, to Roberts. The apparatus compares the amplitude of an audio signal during successive time periods with certain speech detection thresholds and generates an indication of whether the signal contains speech. The amplitude of the audio signal is altered relative to speech detection thresholds as a function of background noise signals which are detected to improve speech detection.

Roberts and other systems which relate to speech detection, do not address adjusting the input amplitude level to assist in and improve voice recognition. Still further, there is a lack of a system to make systematic adjustments to input amplitude levels by sampling a users speech and analyzing it in a controlled fashion and then adjusting an input device based on that sampling and analysis.

SUMMARY OF THE INVENTION

There is provided, in accordance with the present invention a voice recognition method and system for adjusting an input volume control of an input device. This in turn, adjusts an input signal amplitude level of a word spoken into the input device. The user is prompted with a word to speak into an input device, such as a microphone connected to a sound card. The input device converts the spoken word into an electrical signal with an amplitude level ("input signal amplitude level") relative to the volume at which the words were spoken. The input signal amplitude level is compared against a preselected reference signal amplitude level. The preselected reference signal amplitude level is set to a level to enhance voice recognition. An input volume control of the input device is then adjusted to cause the input signal amplitude level to approach the preselected reference signal amplitude level in a predetermined manner.

In a preferred embodiment of the present invention, a step of determining if a word was spoken is performed prior to comparing the spoken word to a reference. The steps of prompting the user for a word, generating an input signal amplitude level for the spoken word, determining if a word was spoken, comparing the input signal amplitude level of the spoken word with respect to the preselected reference signal amplitude level and adjusting an input volume control with respect to the comparison are repeated nine times. During each of the nine iterations, the user is prompted to speak a different word than had been previously prompted.

BRIEF DESCRIPTION OF THE FIGURES

The invention will now be described by way of non-limiting example, with reference to the attached drawings in which.

DETAILED DESCRIPTION OF THE INVENTION

Figure 1:
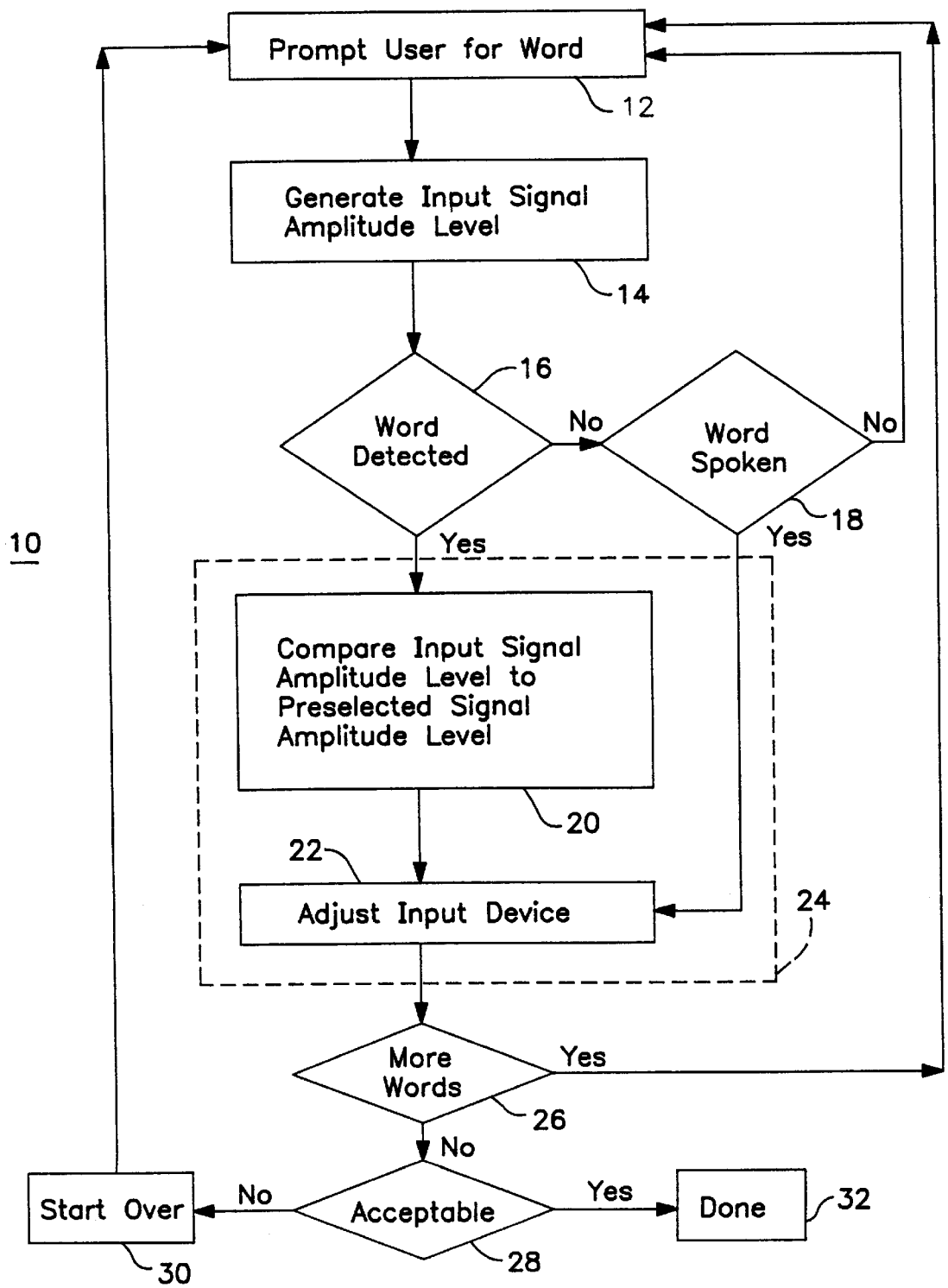
FIG. 1 is a flow diagram showing the method which operates in accordance with the present invention.
Figure 2:
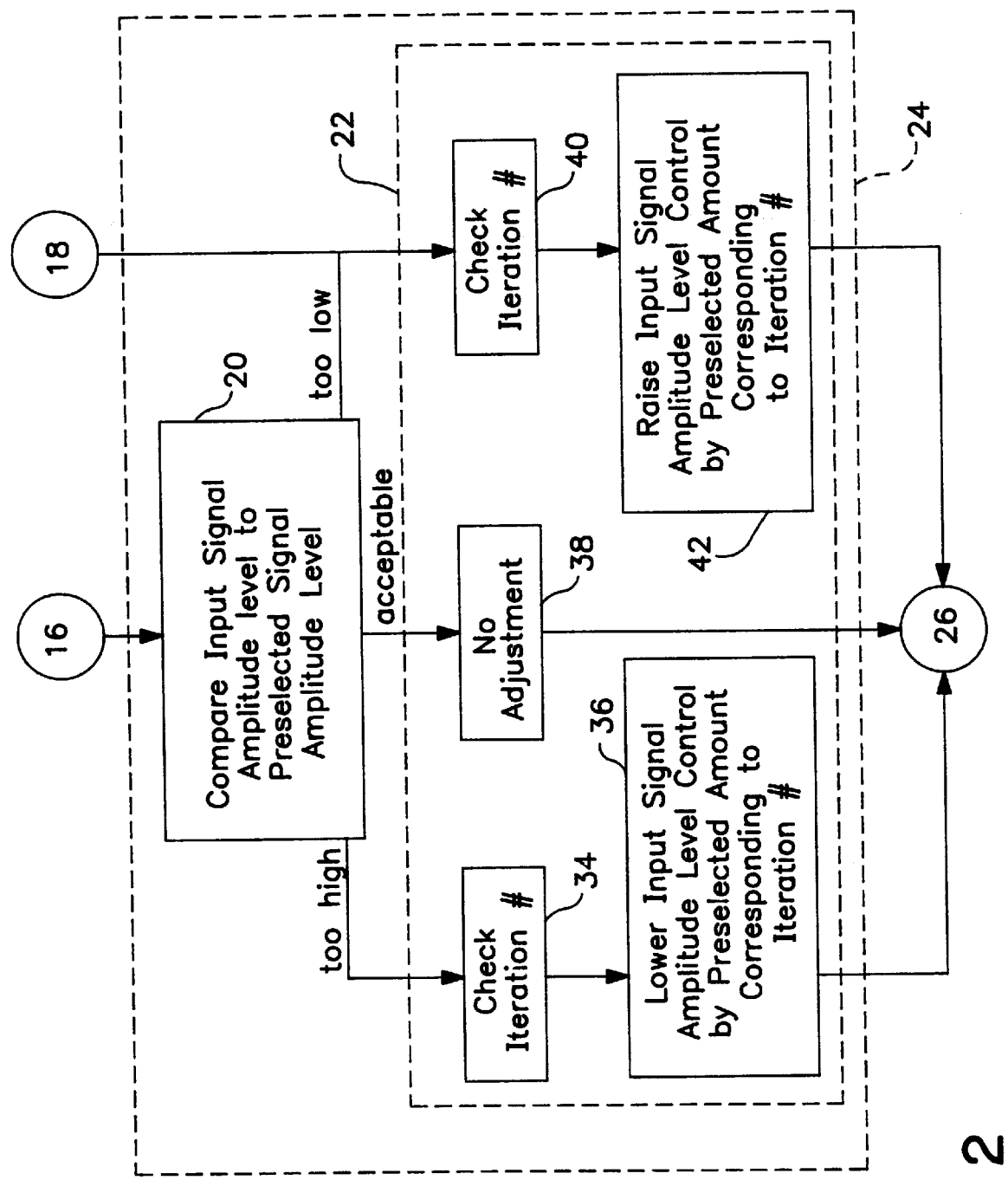
FIG. 2 is a flow chart showing the operation of process block 24 shown in FIG. 1.
Figure 3:
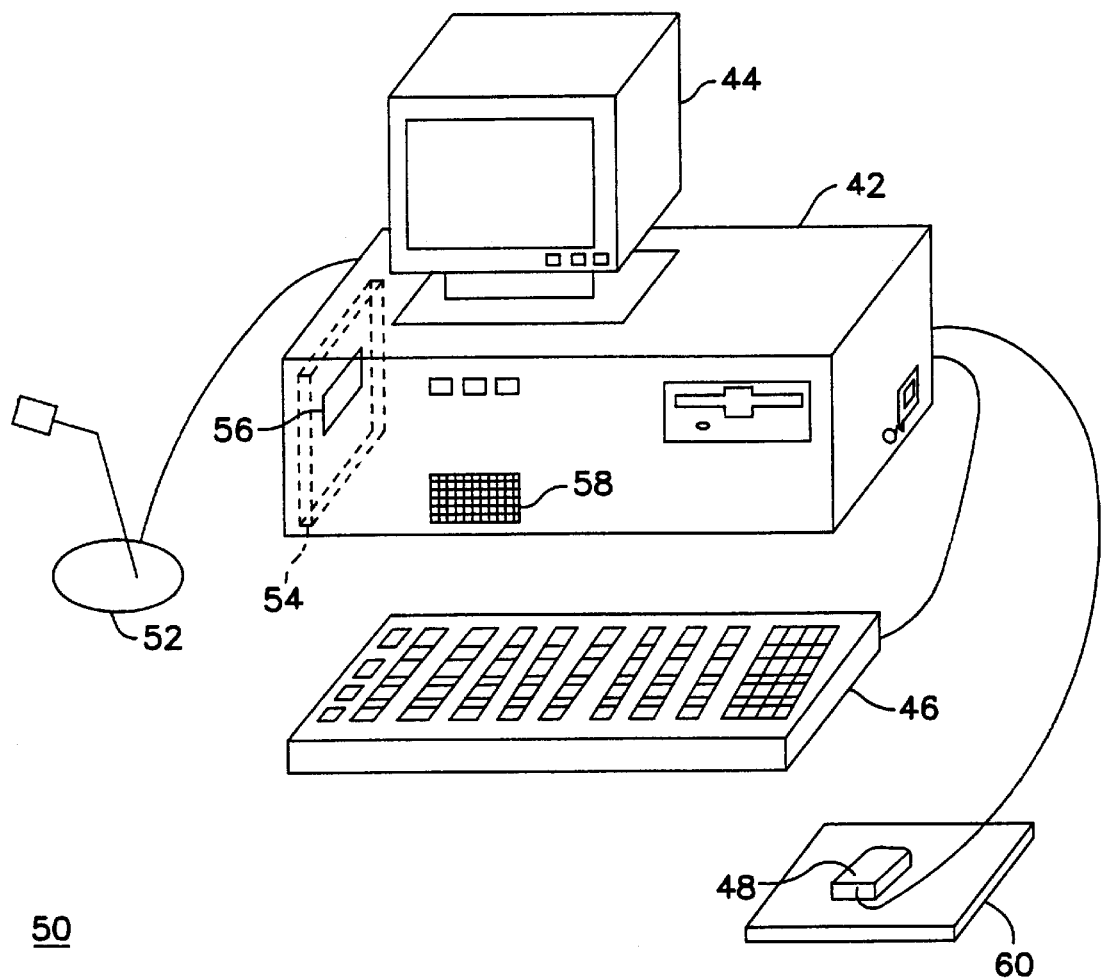
FIG. 3 shows a personal computer and associated peripheral devices used in operating the system and performing the method in accordance with the present invention.

There is shown in FIG. 3 an example computer system 50 for carrying out process 10 shown in the flow charts of FIGS. 1 and 2. Computer system 50 is comprised of a personal computer 42 having several peripheral devices including monitor 44, keyboard 46, mouse 48 (resting on mouse pad 60), microphone 52, sound card 54 (including a CODEC 56) plugged inside of computer 42 and a speaker 58. The present invention is not limited to the configuration for computer system 50 shown in FIG. 3. Other configurations which can operate the present method and system will be understood by those skilled in the art.

Microphone 52 is an input device for generating a representative input signal amplitude level as microphone 52 converts acoustic energy into an analog electrical signal including audio signal information. Microphone 52 is shown connected to sound card 54 in FIG. 3. The combination of microphone 52 and sound card 54 can also be viewed as an input device for generating an input signal amplitude level. A device having a similar function, such as a microphone containing circuitry to carry out the functions of a sound card, including an input volume control, could also serve as an input device.

Other input devices, such as an optical storage device or magnetic storage device could also serve as an input device containing prerecorded "audio" information. In such a system, a digital representation of the audio information is stored on the respective storage device. In such a system, the stored digital audio information could also be used directly in determining an input signal amplitude level.

In a preferred embodiment of the present invention, a microphone is used and thus operates on a real time signal, not a prerecorded signal.

As previously mentioned, microphone 52 is connected to sound card 54. Sound card 54 handles the interface between audio input and output I/O and the computer. It also converts analog signals (i.e., audio waveforms) into a stream of digital data. An example of sound card 54 is the Microsoft WINDOWS Sound System model #206-151v200, which contains a CODEC 56. An example for CODEC 56 is the Analog Devices AD1848 Parallel-Port SoundPort Stereo CODEC ("AD1848 CODEC"). The operation of the AD1848 CODEC is described in the Analog Devices Specification REV 0 for the AD1848 CODEC. Sound Card 54 and CODEC 56 and the Windows Sound System software allow adjustments to the volume or amplitude level of an input signal amplitude level to enhance voice recognition. Other sound cards or devices which handle the interface between audio input/output (I/O) and computer 42 can be used in the system of the present invention.

A monitor 44 is used in the present invention to display a visual prompt to a user with words and messages. Although in a preferred embodiment the user is provided with visual prompts on monitor 44, a user could also be prompted audibly through a speaker 58 or through another output device such as a serial or parallel connected printer (not shown).

In a preferred embodiment, the input signal amplitude level adjustment of the present invention is used in a WINDOWS voice recognition application, such as Voice Pilot version 2.0 which is included with the Microsoft WINDOWS Sound System software (version 2.0) (the reference manual for which is incorporated herein by reference). With this software, spoken words can be used to execute commands, such as resizing a window (i.e., using the spoken words "minimize" or "maximize," respectively). As a WINDOWS application, certain application programming interfaces (APIs) are used to access functions supported by the WINDOWS operating system.

For example, the mixer API included with the MSMIXMGR.DLL and which is a part of the WINDOWS Sound System device driver kit, controls sound card 54 which is plugged into personal computer 42. The mixer API controls a particular sound card 54 plugged into personal computer 42 through a mixer driver written for the particular sound card being used. The WINDOWS Sound System mixer driver is one example of such a driver. The mixer driver allows communication through, and control of, the CODEC 56 located on sound card 54. The mixer API can control several functions, including the input and output volume of sound card 54. Accordingly, it is through the mixer API that input volume adjustments to sound card 54 are made based on the comparison of an input signal amplitude level and a preselected reference signal amplitude level, as discussed below.

Another API used by WINDOWS is the WaveInOpen API, which is a part of the MMSystem.DLL. It is used to access sound card 54 to input sound via microphone 52. The WaveInOpen API calls the Wave driver which in turn is used to "push" data into and out of sound card 54. Sound files used by WINDOWS are formatted in the .WAV file format.

Voice Pilot also contains a voice recognition engine known as the Dragon Recognizer by Dragon Systems, Inc. of Newton, Mass. This voice recognition engine is called/operated through a DLL of Microsoft Sound System called VLAYER.DLL. This DLL contains several APIs which allow function calls to the Dragon Recognizer and is used for polling the Dragon Recognizer to make the comparison between the input signal amplitude level and the preselected reference signal amplitude level. Other voice recognition engines could also be used in voice recognition systems in accordance with the present invention. If a voice recognition engine other than the Dragon Recognizer is used, the APIs in VLAYER.DLL would be changed accordingly to accommodate a different voice recognition engine. As previously noted, the preselected reference signal amplitude level is already entered into the Dragon Recognizer. Some of the APIs and their associated function used in VLAYER.DLL are:

1) SetVoiceWindow—associates a window with the Dragon Recognizer;
2) InitVoiceRecognizer—initializes the Dragon Recognizer to the input hardware (sound card);
3) Recognize—determines whether a word was spoken; and
4) GetUttMeasure—determines whether the input signal amplitude too high, too low, or within an acceptable range as determined by the Dragon Recognizer (by comparison to the reference signal amplitude level).

Other DLL's and APIs for WINDOWS, the WINDOWS Sound System, and the Dragon Recognizer will be understood by those skilled in the art.

There is shown in FIG. 1, a flow chart of a process 10 of the present invention which is carried out on computer system 50. In block 12, a user is prompted for a word to speak into an input means such as microphone 52 or the combination of microphone 52 and sound card 54 shown in FIG. 3. The prompt to the user occurs by way of a dialog box (smaller window) shown in FIG. 4, with text identifying the word to be spoken by the user. In block 14, an input signal amplitude level is determined. The input signal amplitude level is one component of the waveform which results from the conversion of the spoken word (audio signal) into an analog electrical signal by microphone 52. The present invention adjusts the audio input volume, thereby adjusting the input signal amplitude level, to enhance voice recognition.

Although the input waveform has been previously described as including an input signal amplitude level, it is also comprised of a plurality of amplitude levels which result from normal speech. This is a result of both how the human voice operates and how language is communicated with the human voice. As there is no one amplitude level "value," an algorithm is necessary to either generate a single value (such as an average of all amplitude levels sampled if digital signal processing is being used) or analyze the series of amplitude values which comprise the waveform of the spoken word. In the preferred embodiment of the present invention, it is not critical how the comparison of the input signal amplitude level is made, as the preferred embodiment of the present invention is used to enhance the input signal amplitude level for the voice recognition engine being used, in this case, the Dragon Recognizer. The generation of an algorithm to accomplish this comparison would be understood by those skilled in the art such as described in *Principles of Digital Audio*, Ken Pohlmann, Sams, 1989 (2nd edition).

In block 16 it is determined whether or not a user has spoken a word as prompted in block 12. This determination is made on the basis of a preselected threshold input signal amplitude level being detected, not whether a word match has occurred. The prompt to the user in block 12 is to have the user speak and then generate a waveform which has an amplitude level which can be detected and analyzed by the present invention. Certain input devices 52, such as a microphone, can be adjusted or built with varying sensitivity to help isolate or pickup a user's voice.

The preselected threshold input signal amplitude level can be set to a value which accounts for any normal background noise in a typical home or office setting, taking into account the sensitivity and directional characteristics of the microphone or other input device being used. Whether block 16 determines whether a word has been spoken or a preselected threshold input signal amplitude level has been detected, the description which follows refers to block 16 as detecting whether or not a word has been detected or spoken.

If no word is detected in block 16, the user is prompted in block 18 to acknowledge whether or not a word has actually been spoken. In a preferred embodiment, the user is prompted via a WINDOWS dialog box displayed on a computer monitor. The Windows dialog box asks the user to acknowledge whether a word has been spoken by selecting the appropriate button ("yes" or "no" or "help") in the dialog box. As in many WINDOWS applications, the selection of the appropriate button can be made using the keyboard or a pointing device such as a mouse. Also in a preferred embodiment, a timer counts approximately five seconds from when the user is first prompted in block 12 before the user is prompted in block 18 to acknowledge whether a word has been spoken. If a user acknowledges that a word has not been spoken, control returns to block 12 and the user is prompted to speak the particular word into the microphone. If the user acknowledges that a word has been spoken, control drops down to block 22 and the volume level of the input means is adjusted upwardly. The adjustment will always be upward in such a situation as the input volume of input device 52 (such as microphone 52 in FIG. 3) was so low that the system could not even detect that the prompted word had been spoken.

If a word is detected in block 16, processing continues into block 24. Block 24 is comprised of two steps shown in blocks 20 and 22, respectively.

In block 20, the input signal amplitude level is compared to a preselected reference signal amplitude level. The preselected reference signal amplitude level is a desired amplitude level for input signals which is programmed into the system. In one embodiment, the voice recognition engine is preprogrammed with the desired input level, in order to enhance voice recognition. The voice recognition engine also includes a tool which can be queried or polled with an input signal amplitude level to determine whether or not the input signal amplitude level is acceptable (i.e. is within an acceptable range of the preselected reference signal amplitude level). In an additional embodiment, a voice recognition engine may not be polled to make the comparison between the input signal amplitude level and the preselected signal amplitude level. In such a case, an algorithm would have to be generated to determine whether the input signal amplitude level is within an acceptable range of the preselected signal amplitude level.

Once the comparison is made in block 20, processing continues in block 22 where the input volume control, or input level, of the input means is adjusted relative to the comparison made in block 20. If the comparison of the input signal amplitude level to the preselected reference signal amplitude level made in block 20 determines that the input signal amplitude level is below the preselected signal amplitude level, the input volume control is adjusted to amplify or increase the amplitude of the electrical signal generated from the audio input signal. If the comparison in block 20 determines that the input signal amplitude level is higher than the preselected reference signal amplitude level, the input volume control is adjusted to reduce or lower the amplitude of the electrical signal generated from the audio input signal. If the comparison determines that the input signal amplitude level is within an accepted range of the preselected reference signal amplitude level, then no adjustment to the input volume control is made. In a preferred embodiment, an acceptable range for the comparison is within two percent of the preselected reference signal amplitude level. The acceptable range may be adjusted, depending upon the requirements of a particular voice recognition system and/or voice recognition application. Once the input means of volume has been adjusted in block 22, processing continues to block 26. In block 26, it is determined whether or not the user is required to be prompted for additional words. This takes place if multiple passes or iterations are used to initialize the system.

In a preferred embodiment, an iterative process is used whereby the user is prompted to speak nine different words, one following the prompt associated with each iteration, with a comparison to the preselected reference signal amplitude level (the same reference level for each iteration/word) and corresponding adjustments to the input means volume made after each word is spoken. Nine iterations is an arbitrary value which has provided satisfactory results. Fewer or greater number of iterations can be used, depending upon the voice recognition system and or voice recognition application for which the present invention is being used. Although the user is prompted for nine different words, the present invention is not "recognizing" (matching) the words, instead it is detecting and analyzing the input signal amplitude levels.

The iterative process of the present invention begins by prompting the user with the first word in block 12, as previously described. Processing continues as previously described until block 22 is reached. In this iterative method, the input volume control of the input means is initially set to a 50 percent level, half way between the maximum volume setting and the minimum volume setting of the input means. The subsequent adjustments to the input volume control varies for each of the nine words as shown in Table 1:

TABLE 1

| Word No. | Percent Volume is Adjusted |
|---|---|
| 1 | 10 |
| 2 | 10 |
| 3 | 10 |
| 4 | 10 |
| 5 | 5 |
| 6 | 4 |
| 7 | 3 |
| 8 | 2 |
| 9 | 2 |

Table 1 shows the percent upward or downward that the volume control of the input means can be adjusted for each word of the nine for which the user is prompted to speak. The iterations shown in Table 1 are chosen to achieve a result within an acceptable range of two percent between the input signal amplitude level and the preselected reference signal amplitude level. This assumes that the user is speaking at a fairly consistent level for each of the nine words for which the user is prompted. Each iteration may result in a corresponding adjustment made in CODEC 56 which contains the input volume control, in a preferred embodiment.

The operation of the iterative process of the present invention can be understood by the following example. Because the volume control of the input means is initially set to 50 percent for the first word spoken, correspondingly, the input signal amplitude level of the first word spoken by the user is given a value of 50 percent. When compared to the preselected reference signal amplitude level, the preselected reference signal amplitude level is thus given a value relative to the 50 percent level assigned to the input signal amplitude level of the first word. For this example, assume that the preselected reference signal amplitude level is at 38 percent, relative to the 50 percent value assigned to the input signal amplitude level.

On pass one through process 10, the comparison carried out in block 20 would indicate that the input signal amplitude level of the first word is higher than the preselected reference signal amplitude level (50>38). Looking at Table 1, the input volume control would be adjusted downward 10 percent, adjusting the input signal amplitude level for the first spoken word to a value of 40. Since this is the first of nine iterations, block 26 would determine that there are more words to prompt the user and return process control to block 12. This determination can be made by initializing an iteration or word counter with the first word prompted and incrementing the counter with each additional prompt. When the counter equals the total of the words to be prompted, it is complete.

The user would be prompted with a second word which would pass through system 10 for comparison in block 20. Block 20 would again provide a signal that the input signal amplitude level (now for the second word) is greater than the preselected signal amplitude level (40>38). Looking at Table 1, for the second word, the input volume control would be adjusted down another 10 percent adjusting the input signal amplitude level for the second word to a value of 30. Block 26 would indicate that there is another word to prompt the user and process control would return to block 12.

After speaking the third word, process control would flow down to block 20 where a comparison of the input signal amplitude level of the third word is compared to the preselected reference signal amplitude level. This would result in a signal that the input signal amplitude level of the third word is lower than the preselected signal amplitude level (30<38) and the input volume control of the input means would be adjusted upward 10 percent to 40, according to Table 1.

For the fourth word, the comparison of the input signal amplitude level of the fourth word against the preselected reference signal amplitude level would again be a comparison of 40 and 38, requiring that the input signal amplitude level be lowered 10 percent to 30, as shown in Table 1.

For the fifth word, when the comparison carried out in block 20 indicates that the input signal amplitude level for the fifth word is lower than the preselected signal amplitude level (30<38), the input volume control is adjusted upward five percent to 35. For the sixth word, the comparison in block 20 would indicate that the input signal amplitude level for the sixth word is still too low (35<38) and would adjust the input volume control up four percent to 39. For the seventh word, the comparison would show that the input signal amplitude level of the seventh word is too high (39>38) and would lower the input volume control by three percent to 36. For the eighth word, the comparison would show that the volume is too low (36<38) and would adjust the input volume upward two percent to 38. Finally, for the ninth word, the comparison would show that 38=38 and no adjustment is made.

The end of this example results in the input volume control for the input means set to provide an input signal amplitude level of 38 when the preselected signal amplitude level is 38. The above-described adjustments for this example are illustrated in Table 2.

TABLE 2

(Preselected Signal Amplitude Level = 38)

| Word No. | Percent Volume is Adjusted |
| --- | --- |
| 1 | −10 |
| 2 | −10 |
| 3 | +10 |
| 4 | −10 |
| 5 | +5 |
| 6 | +4 |
| 7 | −3 |
| 8 | +2 |
| 9 | no adjustment |

There is shown in FIG. 2 a flow chart of block 24 from FIG. 1, showing how process 10 makes adjustments to the input volume based on the comparison of the input signal amplitude level to the preselected reference signal amplitude level.

There are two entry paths to block 24. First, if a user answers in the affirmative to the prompt from block 18 ("was a word spoken"), the input signal amplitude level would have to be adjusted upward. This requires an adjustment directly by block 22. Second, if a word is detected in block 16, processing continues to block 20 for the comparison to the preselected reference signal amplitude level.

The comparison made in block 20 can result in three conditions: (1) the input signal amplitude level is too high, (2) the input amplitude signal is too low, or (3) the input amplitude signal is within an acceptable range of the preselected reference amplitude level. Each of these three results requires a different adjustment (including a null adjustment for (3)) to the input volume control of the input means.

If the comparison in block 20 determines that the input signal amplitude level is too high, processing continues to block 34 where the iteration number is checked to determine the amount the input volume control level must be adjusted. Processing enters block 34 from block 18, as well, if a users voice input was not detected by the system. Once the appropriate adjustment is determined, processing continues to block 36 where the input volume is lowered the appropriate amount, corresponding to the iteration number.

If the result of the comparison in block 20 determines that the input signal amplitude level is too low, or if a user responds to the prompt from block 18 (FIG. 1) that a word was spoken, processing continues to block 40 where the iteration number is checked to determine the amount the input volume level must be adjusted. Block 40 carries out the same function as block 34. Once the appropriate adjustment is determined, processing continues to block 42 where the input volume is raised the appropriate amount, corresponding to the iteration number. Block 42 operates as the mirror image to block 36.

If the result of the comparison in block 20 determines that the input signal amplitude level is within an acceptable range as compared to the preselected reference signal amplitude level, no adjustment to the input volume control is made.

For the example shown in Table 2, word numbers 1, 2, 4 and 7 require the input volume to be lowered via block 36, while words 3, 5, 6 and 8 require the input volume to be raised via block 42. The input signal amplitude level for word nine matched the preselected reference signal amplitude level (and thus was within an acceptable range) requiring no adjustment of the input volume.

Following the adjustment, if any made in block 24, processing continues to block 26 shown in FIG. 1.

Referring back to FIG. 1, when it is determined in block 26 that there are no more words, processing moves to block 28 where it is determined whether or not the final input signal amplitude level is within an acceptable range. As previously noted for the preferred embodiment the acceptable range is two percent. If the input signal amplitude level for the final word is not within the acceptable range, processing moves to block 30 and process 10 is started over. The user will then be prompted to begin the process with the nine words again. If the input signal amplitude level for the ninth word is within the acceptable range, process 10 is complete.

The nine words a user is prompted to speak in an exemplary embodiment of the present invention are: "Go To Sleep", "Wake Up", "Correction", "Switch To", "Delete", "Take A Note", "File", "Cut", "Undo".

Figure 4:
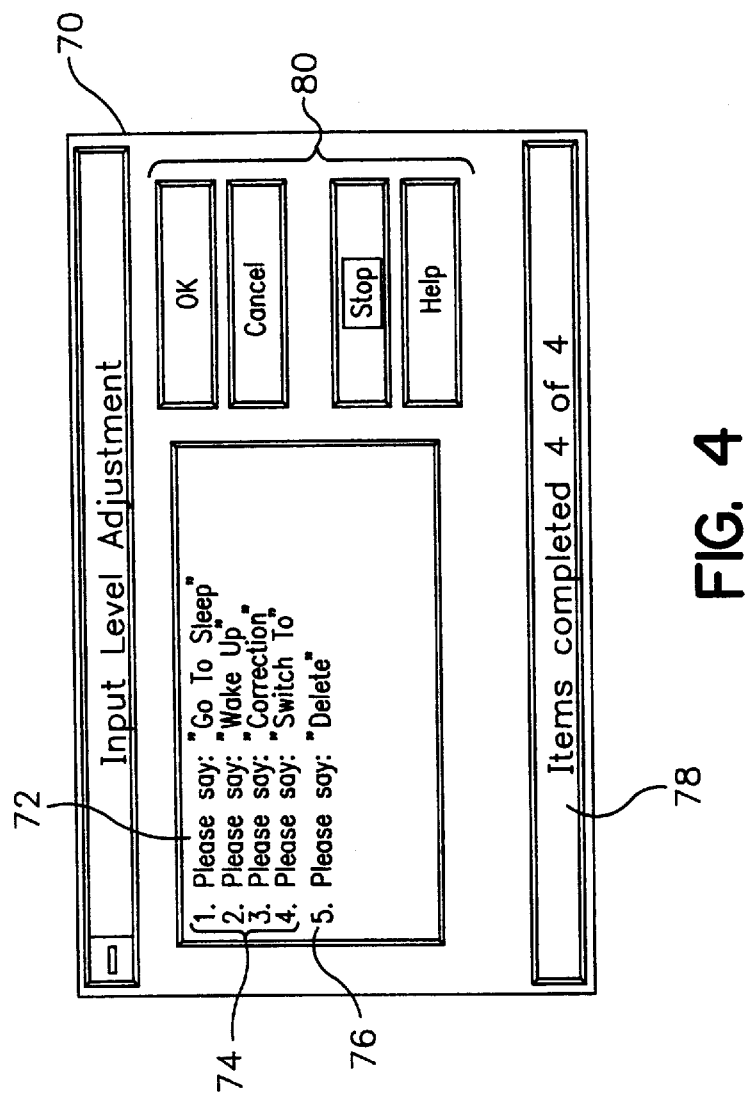
FIG. 4 shows a screen display in accordance with the present invention.

There is shown in FIG. 4 an example screen display 70 in accordance with the present invention. As shown in FIG. 4, screen display 70 is a window which can be displayed when running the Voice Pilot application. Window 70 is accessed by first selecting the "Options" menu from the Voice Pilot menu bar. The "Preferences" menu item is then selected from the "Options" menu. The "Auto" button is selected from the window which appears on screen to begin process 10. At this point, Window 70 appears.

Window 70 contains a prompt display field 72 where the word for a user to speak is displayed. In this way, the user is prompted with a word to speak. Prompt 76 is highlighted in bold, prompting the user to speak the work "Delete" into microphone 52.

Display field 72 also displays some or all of the previously displayed words. Previously displayed words 74 are the four words which had been displayed, one at a time, prior to prompt 76. The number of words which have been displayed to the user is shown in display field 78, as "Items Completed". Four items completed out of nine is indicated in display field 78. Prompt 76 (the word "Delete") is the fifth item, which has not yet been completed.

Also shown in Figure four are control buttons 80. Control buttons 80 allow the user to cancel the input level adjustment, start/stop the input level adjustment and accept the results of a completed input level adjustment. A completed input level adjustment occurs when all nine prompted words are spoken into microphone 52. If process 10 is unable to adjust the input level based on the results of the user speaking the nine words, the user is prompted with a pop up window to repeat the process or to adjust the input level manually.

Although illustrated and described herein with reference to certain specific embodiments, the present invention is, nevertheless, not intended to be limited to the details shown. Rather, various modifications may be made in the details within the scope and range of equivalents of the claims and without departing from the spirit of the invention.

What is claimed is:

1. A computer implemented method for adjusting an input level of an input device in a voice recognition system including a visual display, said input device having an input volume control for adjusting an input signal amplitude level of a word spoken into said input device by a user, comprising the steps of:
    a) prompting on said visual display said user to speak said word into said input device until said word is spoken;
    b) producing from said input device an input signal amplitude level when said word is spoken;
    c) comparing said input signal amplitude level to a preselected signal amplitude level to produce a comparison value;
    d) adjusting said input volume control of said input device with respect to said comparison value to adjust said input signal amplitude level to be within a predetermined range of level values related to said preselected signal amplitude level; and
    e) iteratively repeating steps a) through d) a predetermined number of times.

2. The method of claim 1 comprising the further step of prompting the user for a new word to speak into said input device each time step a) is repeated.

3. The method of claim 1 comprising the further step of repeating steps a) through d) nine times.

4. The method of claim 1 comprising the further step of adjusting the input volume control means in step d) by an iterative process.

5. The method of claim 4 comprising the further step of initializing the input signal amplitude level for a first spoken word at a 50 percent level of said input means, halfway between a maximum volume level and a minimum volume level of said input device for said iterative process.

6. The method of claim 5 comprising the further step of using nine iterations for said iterative process with each of said nine iterations adjusting the input volume control by a maximum iteration value for each of said iterations, wherein:
    a) the maximum iteration value of said first iteration is 10 percent of said maximum amplitude signal level,
    b) the maximum iteration value of said second iteration is 10 percent of said maximum amplitude signal level,
    c) the maximum iteration value of said third iteration is 10 percent of said maximum amplitude signal level,
    d) the maximum iteration value of said fourth iteration is 10 percent of said maximum amplitude signal level,
    e) the maximum iteration value of said fifth iteration is 5 percent of said maximum amplitude signal level,
    f) the maximum iteration value of said sixth iteration is 4 percent of said maximum amplitude signal level,
    g) the maximum iteration value of said seventh iteration is 3 percent of said maximum amplitude signal level,
    h) the maximum iteration value of said eight iteration is 2 percent of said maximum amplitude signal level, and
    i) the maximum iteration value of said ninth iteration is 2 percent of said maximum amplitude signal level.

7. The method of claim 6 comprising the further step of making no adjustment to said input volume control if said input signal amplitude level is within an acceptable range of said preselected signal amplitude level.

8. The method of claim 7 wherein said acceptable range is 2 percent.

9. The method of claim 6 comprising the further step of prompting the user to start the method over if the input signal amplitude level for the ninth spoken word is not in said acceptable range.

10. The method of claim 1 comprising the further step, after step (b) of determining whether a word was spoken by said user.

11. The method of claim 10 wherein the step of determining whether a word was spoken comprises the steps of:
    1) detecting whether a predetermined threshold amplitude level is present after a predetermined amount of time, and
    2) prompting the user to acknowledge whether a word was spoken after said predetermined amount of time has elapsed without detecting said predetermined threshold amplitude level.

12. The method of claim 11 comprising the further step of adjusting the input volume control to a higher level if the user acknowledges that a word was spoken.

13. The computer implemented method for adjusting the input level as recited in claim 1, wherein said spoken word is an audio waveform.

14. A computer implemented system for adjusting an input level of an input device in a voice recognition system including a visual display, said input device having an input volume control for adjusting an input signal amplitude level of a word spoken into said input device by a user comprising:
    a) means for prompting on said visual display a user to speak said word into said input device until said word is spoken;
    b) means for producing an input signal amplitude level when a word is spoken;
    c) means for comparing said input signal amplitude level to a preselected signal amplitude level to produce a comparison value;
    d) means for adjusting said input volume control of said input device with respect to said comparison value to adjust said input signal amplitude level to be within a pre-determined range of level values related to said preselected signal amplitude level; and
    e) means for presetting said means for prompting a user to speak a word into said input device, means for generating an input signal amplitude level when said word is spoken, means for comparing said input signal amplitude level with respect to a preselected signal amplitude level, and means for adjusting the input control of said input device with respect to said comparison to adjust the input signal amplitude level to approach the preselected signal amplitude level in a predetermined manner to operate a preselected number of times.

15. The system of claim 14 wherein each time the user is prompted by said means for prompting a user to speak a word into said input device the user is prompted for a new word to speak into said input device.

16. The system of claim 14 wherein said preselected number of times is preset to nine.

17. The system of claim 14 wherein said means for adjusting the input control of said input device with respect to said comparison to adjust the input signal amplitude level to approach the preselected signal amplitude level in a predetermined manner comprises an iteration means to adjust said input volume control.

18. The system of claim 17 further comprising means for initializing the input signal amplitude level for a first spoken word at a 50 percent level of said input means, halfway between a maximum volume level and a minimum volume level of said input device, for said iteration means.

19. The system of claim 18 wherein said iteration means uses nine iterations with each of said nine iterations adjusting the input volume control by a maximum iteration value for each of said iterations, wherein:
   a) the maximum iteration value of said first iteration is 10 percent of said maximum amplitude signal level,
   b) the maximum iteration value of said second iteration is 10 percent of said maximum amplitude signal level,
   c) the maximum iteration value of said third iteration is 10 percent of said maximum amplitude signal level,
   d) the maximum iteration value of said fourth iteration is 10 percent of said maximum amplitude signal level,
   e) the maximum iteration value of said fifth iteration is 5 percent of said maximum amplitude signal level,
   f) the maximum iteration value of said sixth iteration is 4 percent of said maximum amplitude signal level,
   g) the maximum iteration value of said seventh iteration is 3 percent of said maximum amplitude signal level,
   h) the maximum iteration value of said eight iteration is 2 percent of said maximum amplitude signal level, and
   i) the maximum iteration value of said ninth iteration is 2 percent of said maximum amplitude signal level.

20. The system of claim 19 wherein said means for adjusting said input volume control with respect to said comparison makes no adjustment to said input volume control if said input signal amplitude level is within an acceptable range of said preselected signal amplitude level.

21. The system of claim 20 wherein said acceptable range is 2 percent.

22. The system of claim 20 further comprising means for prompting the user to start over if the ninth spoken word is not in said acceptable range.

23. The system of claim 14 further comprising means for determining whether a word was spoken by a user.

24. The system of claim 23 wherein said means for determining whether a word was spoken by a user further comprises:
   1) means for detecting whether a predetermined threshold amplitude level is present after a predetermined amount of time, and
   2) means for prompting the user to acknowledge whether a word was spoken after said predetermined amount of time has elapsed without detecting said predetermined threshold amplitude level.

25. The system of claim 24 wherein said means for adjusting said input volume control with respect to said comparison adjusts said input volume control to a higher level if the user acknowledges that a word was spoken.

26. The computer implemented system for adjusting the input level as recited in claim 14, wherein said word is an audio waveform.

27. A computer implemented method for adjusting an input level of an input device in a voice recognition system including a visual display, said input device having an input volume control for adjusting an input signal amplitude level of a word spoken into said input device by a user, comprising the steps of:
   a) prompting on said visual display said user to speak said word into said input device until said word is spoken;
   b) producing from the input device an input signal amplitude level corresponding to said word;
   c) comparing said input signal amplitude level with respect to a preselected signal amplitude level;
   d) adjusting said input volume control of said input device with respect to said comparison to adjust said input signal amplitude level to be within a pre-determined range of level values related to said preselected signal amplitude level; and
   e) repeating steps (a) through (d), wherein said prompting step (a) prompts said user for a new word to speak into said input device each time step (a) is repeated, and said adjusting of step (e) includes a different predetermined range corresponding to each repetition.

28. A computer implemented system for adjusting an input level of an input device in a voice recognition system including a visual display, said input device having an input volume control for adjusting an input signal amplitude level of a word spoken into said input device by a user comprising:
   a) means for prompting on said visual display said user to speak a plurality of words into said input device;
   b) means for verifying each one of said words is spoken;
   c) means for repetitively prompting said user to speak until each one of said words is spoken;
   d) means for producing a corresponding input signal amplitude level after each one of said words is spoken;
   e) means for comparing each input signal amplitude level with respect to a preselected corresponding signal amplitude level and for producing a comparison value; and
   f) means for adjusting said input volume control of said input device with respect to each comparison value to adjust said input signal amplitude level to be within a pre-determined range of level values related to said preselected corresponding signal amplitude level.

* * * * *